United States Patent
Mathwig et al.

(10) Patent No.: US 11,062,390 B2
(45) Date of Patent: Jul. 13, 2021

(54) SYSTEM AND METHOD FOR IMPLEMENTING A VIRTUAL BANKING ASSISTANT

(71) Applicant: JPMorgan Chase Bank, N.A., New York, NY (US)

(72) Inventors: Jeffrey Dean Mathwig, Worthington, OH (US); Joe Raquepaw, Delaware, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 67 days.

(21) Appl. No.: 16/502,389

(22) Filed: Jul. 3, 2019

(65) Prior Publication Data

US 2020/0013117 A1 Jan. 9, 2020

Related U.S. Application Data

(60) Provisional application No. 62/694,342, filed on Jul. 5, 2018.

(51) Int. Cl.
G06K 9/00 (2006.01)
G06Q 40/02 (2012.01)
G06Q 30/02 (2012.01)

(52) U.S. Cl.
CPC ......... *G06Q 40/02* (2013.01); *G06K 9/00302* (2013.01); *G06Q 30/0269* (2013.01)

(58) Field of Classification Search
CPC ....................................................... G06Q 40/02
See application file for complete search history.

(56) References Cited

U.S. PATENT DOCUMENTS

| 10,122,856 | B1* | 11/2018 | Langley | H04M 3/5133 |
| 2005/0135571 | A1* | 6/2005 | Bangalore | G06Q 30/0201 |
| | | | | 379/88.01 |
| 2010/0106568 | A1* | 4/2010 | Grimes | G06Q 30/0254 |
| | | | | 705/14.1 |
| 2011/0263946 | A1* | 10/2011 | el Kaliouby | G06K 9/00335 |
| | | | | 600/300 |
| 2012/0030682 | A1* | 2/2012 | Shaffer | H04N 21/2381 |
| | | | | 718/103 |
| 2014/0196143 | A1* | 7/2014 | Fliderman | G06F 21/32 |
| | | | | 726/19 |
| 2017/0264608 | A1* | 9/2017 | Moore | H04W 12/06 |
| 2017/0372574 | A1* | 12/2017 | Linsky | G08B 13/1966 |

OTHER PUBLICATIONS

Kulkarni, in 2017, International Research Journal of Engineering and Technology (IRJET), "Bank Chat Bot—An Intelligent Assistant System Using NLP and Machine Learning".*

* cited by examiner

*Primary Examiner* — Olabode Akintola
*Assistant Examiner* — Brandon M Duck
(74) *Attorney, Agent, or Firm* — Hunton Andrews Kurth LLP

(57) ABSTRACT

The invention relates to a virtual banking assistant that provides an overall awareness for a particular customer. The virtual banking assistant system may observe the customer to identify customer intent and context. For example, the virtual banking assistant system may observe the customer's interactions and listen to conversations. The virtual banking assistant may further access customer historical data, e.g., profile data, current account status, spending habits, late/penalties, fraud data, etc. In addition, recent customer activity may be identified.

18 Claims, 2 Drawing Sheets

SYSTEM AND METHOD FOR IMPLEMENTING A VIRTUAL BANKING ASSISTANT

CROSS REFERENCE TO RELATED APPLICATIONS

The application claims priority to U.S. Provisional Application 62/694,342, filed Jul. 5, 2018, the contents of which are incorporated herein in its entirety.

FIELD OF THE INVENTION

The invention relates generally to a system and method for implementing a virtual banking assistant that ascertains customer intent and responds accordingly.

BACKGROUND OF THE INVENTION

When customers enter a branch or other location, they enter a general line and wait their turn for a teller or other banking representative. This is the case regardless of the customer's needs. For example, the customer may have a simple transaction or more complex needs that require personalized attention. However, current branch locations do not provide a customized experience.

These and other drawbacks currently exist.

SUMMARY OF THE INVENTION

According to one embodiment, the invention relates to implementing a virtual banking assistant system. The system comprises: a memory that stores and manages customer profile data; a recognition interface that identifies a customer based on at least one physical biometric when the customer enters a banking location; a network of capture devices comprising at least one image capture device and at least one voice capture device; and a computer processor, coupled to the recognition interface, the network of capture devices and the memory, configured to: identify, via the recognition interface, a customer identifier associated the customer at the banking location; observe, via the network of capture devices, one or more customer interactions in the banking location wherein the one or more customer interactions comprises a conversation between the customer and at least one banking representative in the banking location; responsive to the one or more customer interactions, identify, via the computer processor, an intent of the customer; and provide one or more actions that address the intent of the customer while the customer is in the banking location.

According to one embodiment, the invention relates to a method for implementing a virtual banking assistant system. The method comprises the steps of: identifying, via a recognition interface, a customer identifier associated the customer at the banking location, wherein the recognition interface that identifies a customer based on at least one physical biometric when the customer enters a banking location; observing, via a network of capture devices, one or more customer interactions in the banking location wherein the one or more customer interactions comprises a conversation between the customer and at least one banking representative in the banking location, wherein the network of capture devices comprises at least one image capture device and at least one voice capture device; responsive to the one or more customer interactions, identifying, via a computer processor, an intent of the customer; and providing one or more actions that address the intent of the customer while the customer is in the banking location.

The method may be conducted on a specially programmed computer system comprising one or more computer processors, mobile devices, electronic storage devices, and networks.

The computer implemented system, method and medium described herein provide the advantages of a virtual banking assistant, according to various embodiments of the invention. The innovative system and method provide personalized and prompt services for customers as they enter a branch location of a financial institution. The system identifies the customer's intent based on current customer interactions and customer profile data to provide specific targeted attention and service. Other advantages that can be provided are customer loyalty and retention due to the increased satisfaction of the account holder. The system provides convenience and security for customers as they transact with various financial devices with a branch location. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details: It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a virtual banking assistant system that provides an overall awareness for a particular customer. The virtual banking assistant system may observe the customer to identify customer intent and context. For example, the virtual banking assistant system may observe the customer's interactions and listen to conversations. The virtual banking assistant may further access customer historical data, e.g., profile data, current account status, spending habits, late/penalties, fraud data, etc. In addition, recent customer activity may be identified. This may include recent online searches, incomplete transactions, call center experiences, chat logs, interactions with bank, merchant, late payments, etc. For example, if a customer started a wire transfer but did not complete it, the customer is likely in the branch location for assistance with the wire transfer. In this scenario, the customer may be greeted by a branch representative with the wire transfer information filled out and ready to be sent, with the customer's approval. The system may also observe the customer's current interactions, which may include in-app activity while in the bank. For example, the customer may access account information with a view detail page of a specific transaction. The specific transaction may have a high likelihood of fraud. In this example, the banking representative may be equipped with alternatives and/or options to mitigate fraud.

The system may include a network of smart devices that observe and interact with the customer while the customer is in a banking location, such as a branch or other in-person experience. The smart devices may include cameras, smart appliances, listening devices, microphone, interactive displays, etc. The smart devices may be stand-alone devices and/or integrated throughout the location.

Figure 1:
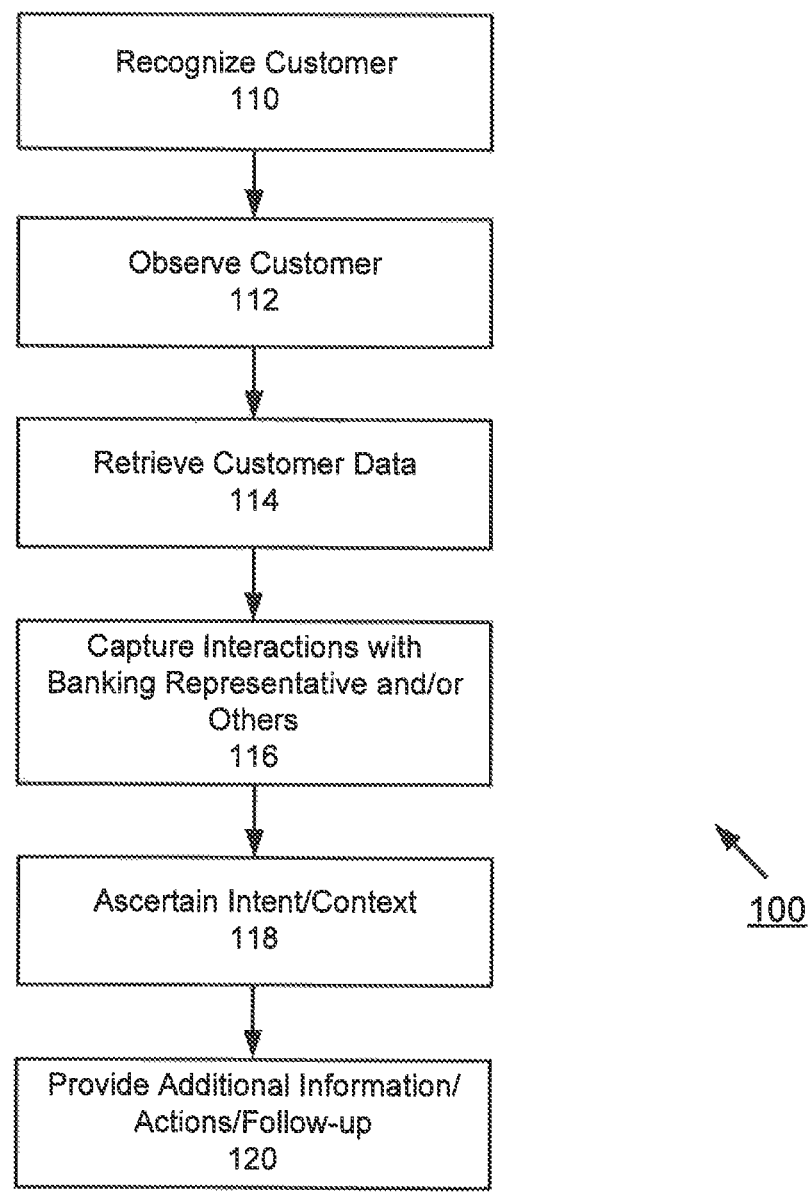
FIG. 1 is an exemplary flowchart of a method for implementing a virtual banking assistant, according to an embodiment of the present invention.

FIG. 1 is an exemplary flowchart of a method for implementing a virtual banking assistant, according to an embodiment of the present invention. At step 110, a customer may be recognized. At step 112, the system may observe the customer. At step 114, the system may retrieve customer data. At step 116, the system may capture/listen to the customer's interactions with a banking representative as well as others. At step 118, the system may ascertain the customer's intent. At step 120, the system may provide a response and/or additional information. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 110, as a customer enters a branch location, the customer may be recognized. The branch location may include ATM devices, tellers, financial advisors and/or other devices. The location may also include other service-based providers. The branch location may include a system that includes a network of capture devices that include image capture devices, listening devices, etc. For example, an image capture device system may recognize the customer based on facial recognition. In addition, other recognition services may be applied. For example, the customer's mobile device may be recognized as the customer enters the location. Based on the recognition, the system may identify the customer by a customer identifier. In addition, the system may become familiar with a customer who frequents a branch location, in this example, the system may recognize the customer by voice, habits, timing of visit and/or other characteristics.

At step 112, the system may observe the customer. The customer may interact with various devices, sources of information as well as customer representatives while in the branch location. The customer may also interact with other customers. Each interaction and/or certain types of interactions may be observed and captured by the system. For example, the system may observe the customer moving about the branch location looking for information.

At step 114, the system may retrieve customer data. Based on the customer identifier, the system may retrieve customer data, which may include a customer profile. The customer profile may include current account status. The customer profile may also include prior customer interactions, including call center inquiries, online searches, in-app activity, successful and failed transactions, etc.

The customer profile may be stored in one or more databases or other memory components. The customer profile may include various forms of customer information, such as customer identification data (e.g., biometrics, demographic, etc.), customer preference data, prior history data (e.g., prior history data at this specific location, prior history for entire company, etc.); existing products/services; account data; transaction data (e.g., merchant data, etc.); web interaction data (e.g., search, web pages visited, etc.); app interaction data; phone interaction data (e.g., IVR, CSR, phone complaint, etc.); type of customer (e.g., premium, high wealth, etc.); past fraud data (e.g., customer's account was compromised last month; customer has been a victim of identity theft, etc.) and/or other relevant data. For example, the system may recognize that the customer made repeated inquiries about a particular new card product. Based on this information, the system instruct a banking representative to provide a targeted opportunity for the new card product to the customer.

At step 116, the system may capture and/or listen to the customer's interaction with the banking representative, other customers, etc. While the customer is in the branch location, the customer may interact with one or more banking representatives. For example, the customer may interact with a banking teller and while the customer is withdrawing funds, the customer may ask a question about automatic deposits. According to another example, the customer may interact with a banking representative to review rates and access current portfolio information. Various other interactions and conversations may be captured by an embodiment of the present invention.

At step 118, the system may ascertain the customer's intent. Based on the customer's interactions, the system may identify what the customer is seeking to accomplish while at the bank location. In addition, the system may identify potential areas for targeted marketing. For example, the branch location may include displays, devices and/or interactive interfaces place throughout the branch location that provide real-time advertising and informational data.

At step 120, the system may provide a response and/or additional information. For example, the customer may seek instructions on how to make automatic deposits using a smart device. The system may respond with a step-by-step tutorial on how to snap an image of a check and make an electronic deposit. Alternatively, a banking representative may walk the customer through the process on the customer's smart phone.

According to an exemplary use case, as a customer enters a branch location, the system may apply facial recognition and identify the customer. The greeter or interactive interface may greet the customer with a personalized message. The system may listen to the customer's interaction with the greeter or other banking representative. The conversation may reveal that the customer is moving and needs to update the customer's address. During the conversation, the customer may reveal her new street address. While listening to the conversation, the system may initiate a process to update the customer's address with the new street address. This may involve populating fields in an electronic new address form. The system may recognize that all the fields have been filled except for the zip code. The system may prompt the banking representative to ask the customer for the zip code. Upon hearing the customer provide the zip code, the system may fill in the zip code and complete the form. According to another example, the system may automatically determine an appropriate zip code based on the street address. If multiple zip codes are returned, the system may request the customer to select a correct one. Other variations may be applied. The banking representative may provide targeted services and/or products that may be useful to a new homeowner, including favorable mortgage rates, home insurance and/or other services and products. The banking representative may also notify a branch location closer to the customer's new location and share customer intelligence to provide a seamless transition.

According to another example, a customer may interact with the banking representative at a workstation. In this example, the customer may seek portfolio performance and status. As the banking representative is compiling the information, the banking representative may gesture to a larger screen and say something like "let's take a look at your data." The gesture, which may be combined with a key phrase, may indicate to the system to now share interactive graphics and performance data on the larger screen with the customer. Other gestures and/or phrases may invoke other actions. For example, the banking representative may gesture to the customer's mobile device and say something like "take a look at this when you have time." This gesture, which may be accompanied by a key phrase, indicates that information may be downloaded/transmitted to the customer's mobile device for a more detailed look later. The gesture may be hand gesture and/or use of an interactive control.

According to another example, the system may listen to a customer's conversation with the banking representative to ascertain customer intent and/or context. For example, the customer may indicate that the customer is interested in "rates." The banking representative may ask what type of rates, such as home rate, mortgage rate, etc. Rather than gathering all the rates mentioned during the conversation, the system may intelligently listen to the conversation to identify that the customer is interested in a specific CD rate, as opposed to all the types or rates mentioned during the conversation. Upon making this connection, the system may provide CD rates to be shared with the customer. In addition, an embodiment of the present invention may provide CD rates that are popular with other customers in the same demographic or other customer profile metric.

An embodiment of the present invention may also be used to train a banker or other representative. As a network of devices is capturing conversations and actions, an embodiment of the present invention may recognize that additional information may be needed to resolve intent. In this case, an embodiment of the present invention may prompt the bank representative to ask a clarifying question and/or confirm a prior answer. Other variations may be applied. In addition, the system may apply a learning component to refine the banker assistant system in terms of predicting and ascertaining a customer's intent.

An embodiment of the present invention may apply a collaborative intent recognition to a conversation involving the customer. For example, the system may identify multiple streams of voice and other data where each stream represents data from a speaker, e.g., customer and banking representative. The system may filter the banking representative's data stream which may be recognized as a known voice, i.e., not the customer. In this example, the banking representative's data stream may contain questions, listing options, etc. Because the banking representative's data stream may not be indicative of the customer's intent, the system may then focus on the customer's voice responsive to the banking representative's questions to ascertain customer intent.

Figure 2:
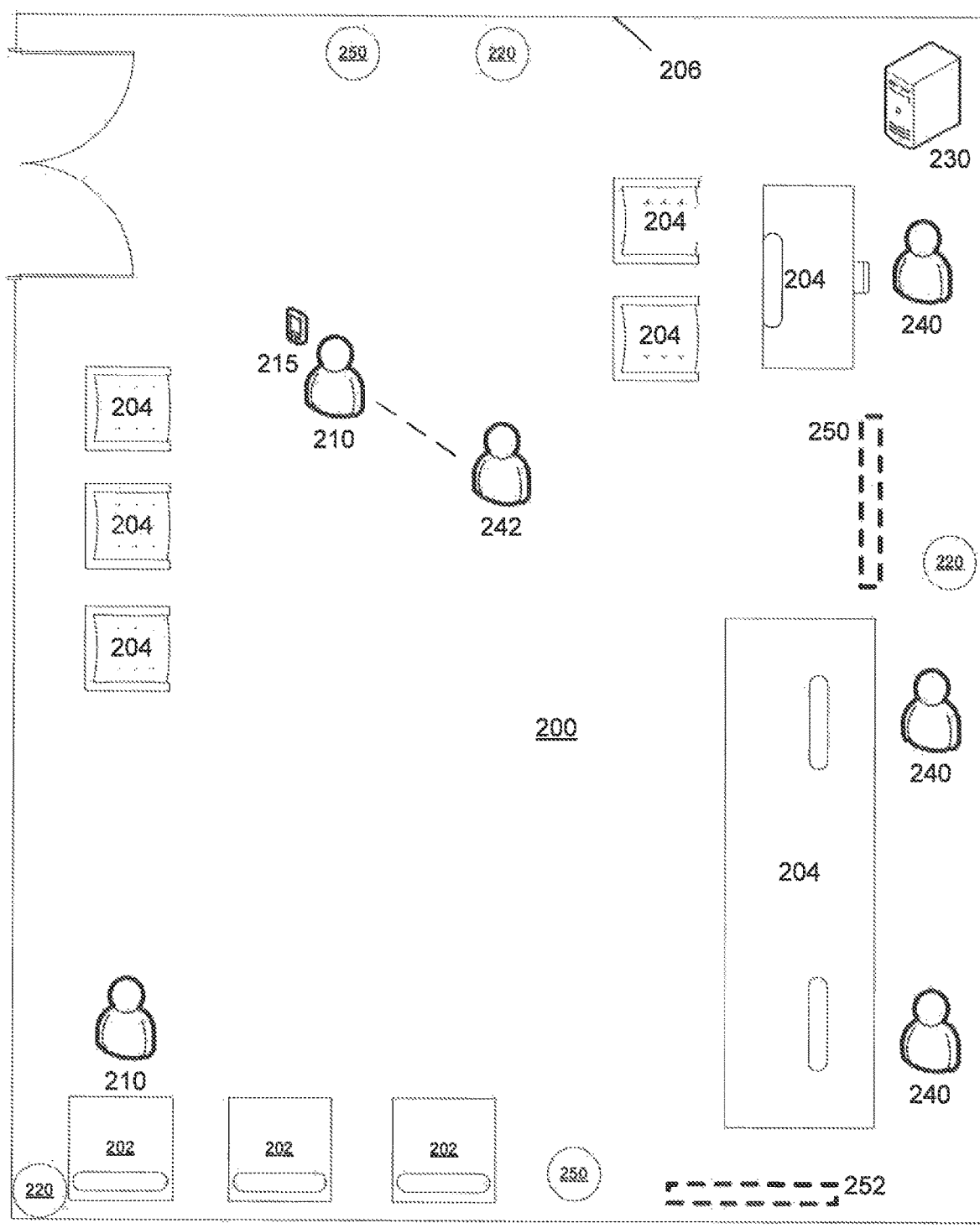
FIG. 2 is an exemplary system diagram for implementing a virtual banking assistant, according to an embodiment of the present invention.

FIG. 2 is an exemplary system diagram for implementing a virtual banking assistant, according to an embodiment of the present invention. FIG. 2 illustrates an exemplary banking location, e.g., bank branch. As shown in FIG. 2, Area 200 may include equipment 202, furniture 204, walls 206, etc.

Other elements may be included in area 200 as is necessary and/or desired, the nature of which may vary based on the purpose of physical location, the type of business, etc. In one embodiment, a plurality of individuals, such as employees 240, customers 210, etc. may be present in area 200.

Area 200 may be monitored by one or more image capture devices 220, such as a camera. Image capture device(s) may be any suitable cameras, including charge-coupled device (CCD) cameras. In one embodiment, cameras 220 may detect the visible spectrum, the IR spectrum, thermal gradients, etc. Image capture device(s) 220 may capture individual images, videos, etc. In one embodiment, image capture device(s) 220 may perform image processing, object identification, etc. on the captured images. Cameras may be located throughout the location. For example, cameras may be integrated on various devices, e.g., ATM devices, printers, terminals, etc. In addition, cameras may be mounted on furniture, chairs, desks, tables, doors, frames, ceiling, walls, pillars, etc. Cameras may also be on employees, via a name tag, pin, mobile device, and/or other mechanism. In addition, other devices may be implemented, including listening devices, microphones, speakers, recorders and/or other devices that capture data, voice, image, etc.

Image capture device(s) 220 and/or other capture devices may be in communication with backend 230 that may receive and process data from image capture device(s) 220. For example, backend 230 may receive data including images, video and/or voice received from image capture device(s) 220 and/or other capture devices and then process the data to identify individuals, objects, equipment, furniture, etc. In one embodiment, backend 230 may associate each individual 210 or 240 with a vector indicating a direction of facing/movement and a velocity of movement (if appropriate).

As shown in FIG. 2, an embodiment of the present invention may capture individual 210 as the individual interacts with bank representative 242. An embodiment of the present invention may capture voice streams during a conversation and from the voice streams, determine content and intent, e.g., why customer 210 is in the bank location. Image capture devices may capture body posture, hand gestures, gait and/or other physical markers and indicators. As the individual interacts with area 200, one or more capture devices may identify the customer's interactions and conversations.

An embodiment of the present invention may be directed to identifying a customer or individual 210 as they enter Area 200. Customer 210 may be recognized through various biometrics, including facial recognition. For example, customer 210 may have one or more features and/or attributes, such as size (e.g., height and weight), gait, posture, etc. that may be used to identify and/or determine movement of the customer. In addition, customer 210 may be recognized by an associated object 215. Examples of object 215 may include a mobile device, such as a smart phone, tablet, wearable, etc. as well as other electronic device. Area 200 may include one or more beacons 250 that may communicate with object 215 being carried by individual 210 or 240. The beacon may be used to communicate with object 215 to interact with individual 210 or 240. Other recognition mechanisms may be applied.

An embodiment of the present invention may be directed to providing authentication of the individual 210. This may involve a collaboration with an authentication system to verify or confirm the individual's identity. For example, an embodiment of the present invention may perform real-time authentication of the individual 210.

In addition, an embodiment of the present invention may recognize activities, actions, conversations and/or interactions involving individual 210. For example, an embodiment of the present invention may capture voice streams from a conversation with a branch representative, other customers, interactive device, etc. An embodiment of the present invention may also recognize activity performed by the customer prior to entering the bank location, represented by Area 200. The prior activity may provide context and background relevant to the customer's current inquiry and/or interactions at the bank location. For example, an embodiment of the present invention may identify a customer upon entering Area 200 (via face recognition or device recognition) and then promptly recognize that the customer is late on his mortgage payment. This additional information may provide insight and context into the customer's visit. According to another example, an embodiment of the present invention may identify a customer and recognize that the customer has started a complex online transaction but failed to complete the transaction (e.g., wire transfer, investment action, etc.). This failed transaction may be a reason why the customer is now in a branch location.

An embodiment of the present invention is directed to identifying an individual's intent as they enter and interact with an environment. An embodiment of the present invention is further directed to collaborating with various other systems, processes and components (local and remote) in accordance with the identified customer's intent. For example, an individual may enter a banking environment and indicate to a banker that the individual is seeking five rolls of quarters. An embodiment of the present invention may detect the individual's intent and be directed to a coin dispenser. The coin dispenser may recognize the individual's identity, authenticate the individual and greet the individual by name and dispense five rolls of quarters. According to another example, another customer may seek a home loan. When the customer enters the banking location and is recognized and authenticated, the system may observe that the customer communicated a request for home loan information to a banker. When the customer is directed to an available representative, the representative may have the customer's file and necessary information to complete the home loan and address other related needs.

Based on the identity of individual 210 or 240 and/or current interactions, an embodiment of the present invention may present targeted advertisements, messages, offers, information and/or directions to individual 210 while individual 210 waits, when individual 210 uses the device, etc.

An embodiment of the present invention may perform data analytics to analyze foot traffic, congestion, peak hours, types of activity, effectiveness of marketing material and placement. For example, an embodiment of the present invention may suggest optimal marketing placement based on analyzed traffic patterns and usage data. In this example, an embodiment of the present invention may suggest advertisement placement at 252. In another example, an embodiment of the present invention may seek to determine effectiveness of an advertisement placed at 250. This may be determined by whether individuals stop to interact with advertisement 250. Other metrics and activities may be captured and analyzed. In this example, an embodiment of the present invention may recognize that more individuals interact with advertisement 252 compared to 250 and further confirm that advertisements nearest to tellers receive the better exposure.

While the exemplary application involves a branch location of a financial institution, the various features of the invention may be applied to other locations, including a retail store location, restaurants, malls, a hotel lobby, an office building, a common/public area, parking garage, and/or other predefined or predetermined location of varying scale and scope.

Additional details concerning object recognition and association with an identity are detailed in co-pending U.S. Ser. No. 15/999,146, filed Aug. 17, 2018, which claims priority to U.S. Provisional Application 62/546,717, filed Aug. 17, 2017, the contents of which are incorporated by reference herein in their entirety. Additional details concerning combined augmented and virtual reality are detailed in co-pending U.S. Ser. No. 15/999,145, filed Aug. 17, 2018, which claims priority to U.S. Provisional Application 62/546,908, filed Aug. 17, 2017, which are incorporated herein in their entirety.

The following descriptions provide different configurations and features according to exemplary embodiments. These configurations and features may relate to providing financial services through financial services machines. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

A customer may interact with the system through various mobile and other devices including mobile phones, smart devices, tablets, smartwatches, smart glasses, other wearables or other computing devices capable of sending or receiving network signals.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer spend, the principles of the invention can be applied to other vendors and entities where the operating entity can assemble and provide relevant, timely information to enhance the customer's experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the system may include a number of servers and user communication devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (Paas), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a virtual banking assistant, the system comprising:
a memory that stores and manages customer profile data comprising, historical customer data including current status of one or more customer accounts, spending habits, late penalties, fraud data, and banking habits, and current customer data including online search activity, incomplete transactions, call center experiences, chat logs, and interactions with one or more bank branches;

a recognition interface that identifies a customer based on one or more of at least one physical biometric when the customer enters a banking location and the recognition interface's learning of the customer's habits including a timing of the customer's visits to the banking location;

a network of capture devices comprising at least one image capture device and at least one voice capture device; and a computer processor, coupled to the recognition interface, the network of capture devices and the memory, configured to:

identify, via the recognition interface, a customer upon the customer's entry into the banking location;

observe, via the network of capture devices, one or more customer interactions in the banking location wherein the one or more customer interactions comprises a conversation between the customer and at least one banking representative in the banking location;

filter, for the conversation between the customer and at least one banking representative, a data stream representing the customer's voice from a data stream representing the at least one banking representative's voice;

retrieve, from the memory, customer profile data corresponding to the identified customer;

identify an intent of the customer based on the filtered data stream representing the customer's voice and the customer profile data corresponding to the identified customer; and provide one or more actions that address the intent of the customer while the customer is in the banking location.

2. The system of claim 1, wherein the at least one physical biometric comprises face recognition.

3. The system of claim 1, wherein the computer processor is further configured to:

retrieve customer profile data using the customer identifier to provide context to a current customer interaction at the branch location.

4. The system of claim 1, wherein the customer profile data comprises data relating to a recent interaction.

5. The system of claim 1, wherein the one or more customer interactions comprises an interaction with a branch location terminal at the banking location.

6. The system of claim 1, wherein the one or more customer interactions comprises an interaction with another customer at the banking location.

7. The system of claim 1, wherein identifying the customer by the customer identifier further comprises authentication of the customer in real-time.

8. The system of claim 1, wherein the one or more actions comprises completing an electronic form.

9. The system of claim 1, wherein the one or more actions comprises presenting a targeted advertisement to the customer at the branch location.

10. A method that implements a virtual banking assistant, the method comprising the steps of:

identifying, via a recognition interface, a customer upon the customer's entry into the banking location, wherein the recognition interface that identifies a customer based on one or more of at least one physical biometric when the customer enters a banking location and the recognition interface's learning of the customer's habits including a timing of the customer's visits to the banking location;

observing, via a network of capture devices, one or more customer interactions in the banking location wherein the one or more customer interactions comprises a conversation between the customer and at least one banking representative in the banking location, wherein the network of capture devices comprises at least one image capture device and at least one voice capture device;

filtering, via a computer processor, for the conversation between the customer and at least one banking representative, a data stream representing the customer's voice from a data stream representing the at least one banking representative's voice;

retrieve, from a memory, customer profile data corresponding to the identified customer comprising, historical customer data including current status of one or more customer accounts, spending habits, late penalties, fraud data, and banking habits, and current customer data including online search activity, incomplete transactions, call center experiences, chat logs, and interactions with one or more bank branches;

identifying an intent of the customer based on the filtered data stream representing the customer's voice and the customer profile data corresponding to the identified customer; and providing one or more actions that address the intent of the customer while the customer is in the banking location.

11. The method of claim 10, wherein the at least one physical biometric comprises face recognition.

12. The method of claim 10, further comprising the step of:

retrieving, from a memory, customer profile data using the customer identifier to provide context to a current customer interaction at the branch location.

13. The method of claim 10, wherein the customer profile data comprises data relating to a recent interaction.

14. The method of claim 10, wherein the one or more customer interactions comprises an interaction with a branch location terminal at the banking location.

15. The method of claim 10, wherein the one or more customer interactions comprises an interaction with another customer at the banking location.

16. The method of claim 10, wherein identifying the customer by the customer identifier further comprises authentication of the customer in real-time.

17. The method of claim 10, wherein the one or more actions comprises completing an electronic form.

18. The method of claim 10, wherein the one or more actions comprises presenting a targeted advertisement to the customer at the branch location.

* * * * *